United States Patent
Yura

(10) Patent No.: US 12,323,018 B2
(45) Date of Patent: Jun. 3, 2025

(54) THREE-PHASE INDUCTION MOTOR

(71) Applicant: OKUMA Corporation, Aichi (JP)

(72) Inventor: Motozumi Yura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 254 days.

(21) Appl. No.: 18/296,130

(22) Filed: Apr. 5, 2023

(65) Prior Publication Data

US 2023/0327532 A1    Oct. 12, 2023

(30) Foreign Application Priority Data

Apr. 5, 2022  (JP) .................................. 2022-063064

(51) Int. Cl.
*H02K 17/14*  (2006.01)
*H02K 3/12*   (2006.01)
*H02P 25/20*  (2006.01)

(52) U.S. Cl.
CPC ............... *H02K 17/14* (2013.01); *H02K 3/12* (2013.01); *H02K 2213/03* (2013.01)

(58) Field of Classification Search
CPC .......... H02K 17/14; H02K 17/06; H02K 3/12; H02P 25/20
USPC .................... 310/159, 166, 184–185; 318/82, 318/772–773, 777
See application file for complete search history.

(56) References Cited

U.S. PATENT DOCUMENTS

| | | | | | |
|---|---|---|---|---|---|
| 1,477,862 A | * | 12/1923 | Barr | | 318/446 |
| 1,609,310 A | * | 12/1926 | Rodgers | | H02K 17/06 318/775 |
| 2,174,758 A | * | 10/1939 | Rall | | H02K 17/06 318/773 |
| 3,673,477 A | * | 6/1972 | Broadway | | H02K 17/14 318/773 |
| 4,473,788 A | * | 9/1984 | Kirschbaum | | H02P 25/20 318/776 |
| 7,598,648 B2 | * | 10/2009 | Fei | | H02K 17/06 310/198 |
| 9,677,531 B2 | * | 6/2017 | Ramamoorthy | | H02K 3/28 |
| 10,855,218 B2 | * | 12/2020 | Zhang | | H02P 25/20 |
| 10,992,248 B2 | * | 4/2021 | Chen | | H02P 25/20 |
| 2011/0187307 A1 | * | 8/2011 | Coldwate | | H02K 17/14 318/777 |
| 2014/0049139 A1 | * | 2/2014 | Peng | | H02K 19/12 310/68 R |

FOREIGN PATENT DOCUMENTS

| | | |
|---|---|---|
| JP | 55037877 A | 3/1980 |
| JP | S5522857 Y | 5/1980 |
| JP | 57043547 A | 3/1982 |

* cited by examiner

*Primary Examiner* — Burton S Mullins
(74) *Attorney, Agent, or Firm* — CANTOR COLBURN LLP

(57) ABSTRACT

In a three-phase induction motor, each of coils of three phases has a first coil unit and a second coil unit placed in 180-degree symmetry, each of the coil units has a first coil and a second coil, the first coil is formed by winding a winding once in an electrical angle range of 180 degrees during a two-pole operation, the second coil is formed by winding the winding twice in a range of a center third when the first coil is equally divided into three parts in a circumferential direction, in such a manner that a current flows in a direction opposite to a direction of current flowing in the first coil.

6 Claims, 9 Drawing Sheets

DURING TWO-POLE OPERATION

DURING SIX-POLE OPERATION

DURING SIX-POLE OPERATION

DURING TWO-POLE OPERATION

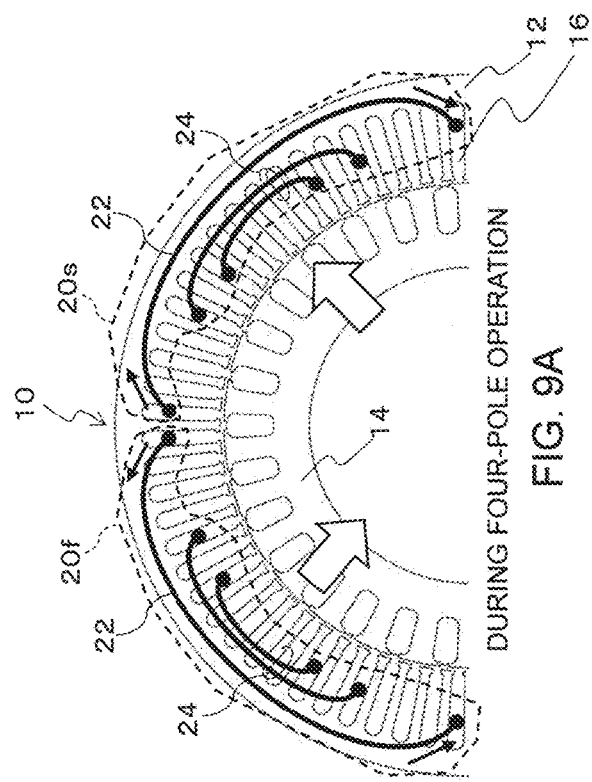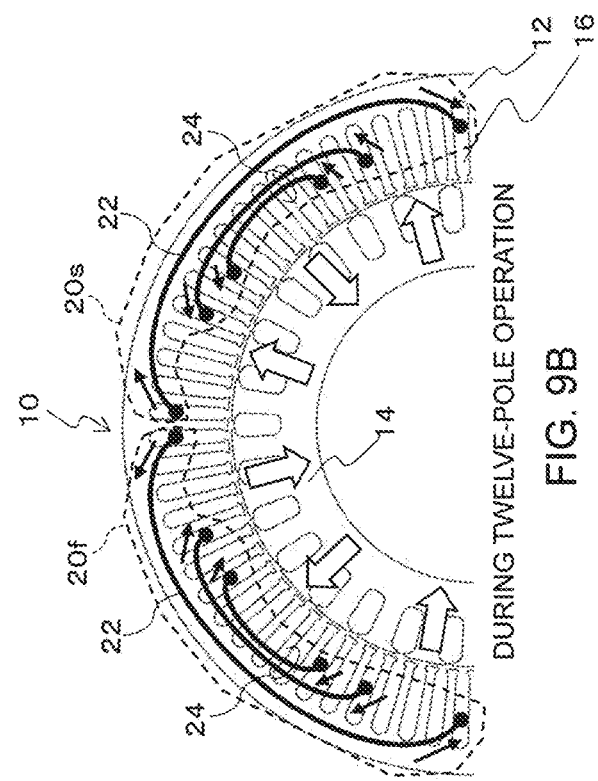

THREE-PHASE INDUCTION MOTOR

CROSS REFERENCE TO RELATED APPLICATION

The present invention claims priority under 35 U.S.C. § 119 to Japanese Application, 2022-063064, filed on Apr. 5, 2022, the entire contents of which being incorporated herein by reference.

TECHNICAL FIELD

The present disclosure relates to a three-phase induction motor in which coils of three phases are wound around a plurality of slots formed on an inner circumference of a stator iron core.

BACKGROUND

In machine tools which machine press dies, or resin mold dies, during finish machining of the die, a curved surface machining is performed using a small-size ball end mill having a tool size of less than or equal to about a few mm. Because of the small size, in order to obtain an appropriate peripheral speed, or in order to shorten the machining time, a high rotating speed of a few tens of thousands of rpms is demanded. In order to realize such a high-speed rotation, a built-in motor structure is employed in which a rotor of a motor is directly equipped on a spindle.

In addition, because a free-form surface of the die is machined with the small-size tool, the operation becomes a continuous operation for a long period of time, and thus, a low amount of heat generation of the motor is demanded. In particular, in the high-speed rotation, the heat generation due to the iron loss of the stator and heat generation of the bearing of the spindle inevitably become large, and thus, a low amount of heat generation is demanded for a winding of the motor. Due to the properties of the built-in motor structure, a large heat generation results in a large thermal displacement of the spindle, and consequently, degradation of machining precision.

On the other hand, it is necessary to machine holes used for fixing the die on a press machining device or an injection molding device. In order to perform the press machining or injection molding with high precision, in many cases, the fixation holes are machined on the same machine as the finish machining described above. Generally, in many cases, the hole machining is performed through drill machining of about a few tens of mm, and a large torque is demanded at a low speed, which is an opposite configuration from the finish machining described above. FIG. 2 is a diagram showing a rotating speed and a torque of the spindle demanded for die machining. That is, a large torque is demanded in a low-speed region, and a high-speed region of a high rotating speed is demanded for the finish machining.

In the related art, as a technique for expanding the speed range including the low speed and high speed, Y-Δ switching is generally used in which the windings of the three-phase induction motor are switched between star connection and delta connection. However, the Y-Δ switching theoretically has a rotating speed ratio of the delta connection to the star connection of 1.73 times ($\sqrt{3}$ times), and sufficient speed range cannot be secured.

As another technique for expanding the speed range, pole number switching is known. In general, the number of poles is switched between two poles and four poles, or between four poles and eight poles in many cases, but the rotating speed ratio in these configurations is two times, which is still not sufficient.

JP S55-22857 U discloses a technique for realizing a rotating speed ratio of 3 times by switching between two poles and six poles. In this technique, six winding coils placed in a distributed manner are provided for each phase. When the motor is used in a two-pole configuration, directions of current for the six coils are set to the same direction, and when the motor is used in a six-pole configuration, four coil currents out of the six coil currents are set to the opposite direction to the remaining coil currents.

JPS55-37877 A discloses a technique for realizing a rotating speed ratio of 3 times by switching between two poles and six poles. Similar to JP S55-22857 U, this technique has six winding coils for each phase, but differs in that each pole of the six poles is formed from six coils which are placed in a divided manner. When the motor is used in a six-pole configuration, the directions of currents of adjacent coils are set opposite to each other, and when the motor is used in a two-pole configuration, directions of the coil currents of three adjacent coils out of the six coils are set to the same direction.

JP S57-43547 A discloses a technique for realizing a rotating speed ratio of 4 times by switching between two poles and eight poles. In this technique, similar to JP S55-22857 U, six winding coils which are placed in a distributed manner are provided for each phase. When the motor is used in a two-pole configuration, the directions of currents of the six coils are set to the same direction, and when the motor is used in an eight-pole configuration, four coil currents out of the six coil currents are set to be opposite to the remaining coil currents. The six coils are placed in two groups of three coils at two locations among locations equally dividing the inner circumference of the stator of the motor into four, and no winding coil is placed at the remaining two locations among the four locations, so as to form eight poles with six coils.

In the technique of JP S55-22857 U, because the coils forming the six poles are placed apart from each other, when the motor is used in the six-pole configuration, magnetomotive force is not generated in a large portion of the motor, and approximately 50% of the stator iron core is not effectively used. Because of this, there is a problem in that the large torque demanded for the low-speed region cannot be sufficiently output.

In the technique of JP S55-37877 A, currents are applied to all of the six coils even when the motor is used in the two-pole configuration. Thus, in four coils out of the six coils, no magnetic flux is generated even when the current flows, and the four coils thus wastefully generate heat. Because of this, there is a problem in that, in the high-speed rotation region where the two-pole configuration is demanded, the temperature increase of the motor becomes large.

In the technique of JP S57-43547 A, because the six coils are placed apart from each other, when the motor is used in the eight-pole configuration, the magnetomotive force is not generated in a large portion of the motor, and approximately 50% of the stator iron core is not effectively used. Because of this, there is a problem in that the large torque demanded for the low-speed region cannot be sufficiently output.

SUMMARY

According to one aspect of the present disclosure, there is provided a three-phase induction motor in which coils of three phases are wound around a plurality of slots formed on an inner circumference of a stator iron core, wherein each of the coils of three phases includes one or in more unit pairs, each formed from a first coil unit and a second coil unit, the first coil unit and the second coil unit are placed in a 180-degree symmetry in an electrical angle during a (2×n)-pole operation, each coil unit has a first coil and a second coil, the first coil is formed by winding a winding m times in an electrical angle range of 180 degrees during the (2×n)-pole operation, the second coil is formed by winding the winding (2×m) times in a range of a center third when the first coil is equally divided into three parts in a circumferential direction, in such a manner that a current flows in a direction opposite to a direction of current flowing in the first coil, the three-phase induction motor operates with (6×n) poles by applying electricity to both the first coil and the second coil, and the three-phase induction motor operates with (2×n) poles by applying electricity to only the first coil, and each of the m and the n is a natural number.

In this structure, the first coil of the first coil unit and first coil of the second coil unit may be connected in series, the second coil of the first coil unit and the second coil of the second coil unit may be connected in series, and there may be no connection between the first coil and the second coil.

The stator iron core may have 36 slots, the first coil of a U-phase may include a coil wound from a 1st slot to an 18th slot, and a coil wound from a 36th slot to a 19th slot, the first coil of a V-phase may include a coil wound from a 22nd slot to a 6th slot, and a coil wound from a 24th slot over the 36th slot to a 4th slot, the first coil of a W-phase may include a coil wound from a 15th slot to a 31st slot, and a coil wound from a 13th slot over the 1st slot to a 33rd slot, the second coil of the U-phase may include a coil wound from a 12th slot to a 7th slot, a coil wound from a 14th slot to a 5th slot, a coil wound from a 23rd slot to a 32nd slot, and a coil wound from a 25th slot to a 30th slot, the second coil of the V-phase may include a coil would from a 10th slot to a 17th slot, a coil wound from an 11th slot to a 16th slot, a coil wound from a 35th slot to a 28th slot, and a coil wound from a 34th slot to a 29th slot, and the second coil of the W-phase may include a coil wound from a 2nd slot to a 9th slot, a coil wound from a 3rd slot to an 8th slot, a coil wound from a 27th slot to a 20th slot, and a coil wound from a 26th slot to a 21 st slot.

According to another aspect of the present disclosure, there is provided a three-phase induction motor in which coils of three phases are wound around a plurality of slots formed on an inner circumference of a stator iron core, wherein each of the coils of three phases includes one or more unit pairs, each formed from a first coil unit and a second coil unit, the first coil unit and the second coil unit are placed in 180-degree electrical angle symmetry during (2×n)-pole operation, each coil unit has a first coil and a second coil, the first coil is formed by winding a winding m times in an electrical angle range of 180 degrees during the (2×n)-pole operation, the second coil is formed by winding the winding (2×m) times in a range of a center third when the first coil is equally divided into three parts in a circumferential direction, in such a manner that a current flows in a direction opposite to a direction of current flowing in the first coil, the three-phase induction motor operates with (6×n) poles by applying electricity to both the first coil and the second coil of all of the coil units, and the three-phase induction motor operates with (2×n) poles by applying electricity to only the first coil of the first coil unit, and each of the m and the n is a natural number.

In this structure, there may be no connection between the first coil of the first coil unit and the second coil, or between the first coil of the first coil unit and the first coil of the second coil unit, and the second coil of the first coil unit, the second coil of the second coil unit, and the first coil of the second coil unit may be connected to each other.

The stator iron core may have 36 slots, the first coil of a U-phase may include a coil wound from a 1st slot to a 19th slot, and a coil wound from a 36th slot to an 18th slot, the first coil of a V-phase may include a coil wound from a 6th slot to a 24th slot, and a coil wound from a 4th slot over the 1st slot to a 22th slot, the first coil of a W-phase may include a coil wound from a 13th slot to a 31st slot, and a coil wound from a 15th slot to a 33rd slot, the second coil of the U-phase may include a coil wound from a 12th slot to a 7th slot, a coil wound from a 14th slot to a 5th slot, a coil wound from a 23rd slot to a 32nd slot, and a coil wound from a 25th slot to a 30th slot, the second coil of the V-phase may include a coil would from a 17th slot to a 10th slot, a coil wound from a 16th slot to an 11th slot, a coil wound from a 28th slot to a 35th slot, and a coil wound from a 29th slot to a 34th slot, and the second coil of the W-phase may include a coil wound from a 27th slot to a 20th slot, a coil wound from a 26th slot to a 21st slot, a coil wound from a 2nd slot to a 9th slot, and a coil wound from a 3rd slot to an 8th slot.

According to the three-phase induction motor of the present disclosure, when the three-phase induction motor operates with (6×n) poles, a portion where no magnetomotive force is generated in one round of the stator is small, and the usage efficiency of the iron core is high. Thus, the torque per unit volume of motor can be increased and a large torque can be generated. On the other hand, when the three-phase induction motor operates with (2×n) poles, no redundant current for generating magnetic field is necessary, resulting in low heat generation. Thus, an increase in temperature of the motor can be suppressed even at a high-speed rotation.

BRIEF DESCRIPTION OF DRAWINGS

Embodiment(s) of the present disclosure will be described based on the following figures, wherein:

FIG. 9A is a diagram showing a direction of a current and a direction of a magnetic flux when the three-phase induction motor according to the other embodiment of the present disclosure is operated with 4 poles; and FIG. 9B is a diagram showing a direction of a current and a direction of a magnetic flux when the three-phase induction motor according to the other embodiment of the present disclosure is operated with 12 poles.

DESCRIPTION OF EMBODIMENTS

Figure 1B:
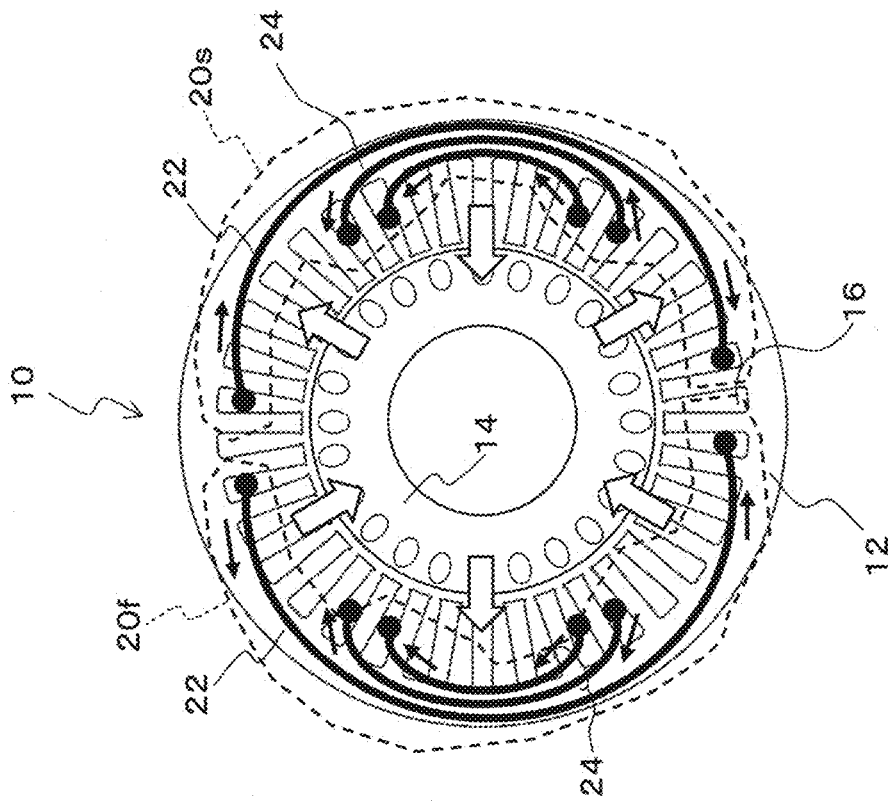
FIG. 1B is a diagram showing a direction of current and a direction of a magnetic flux when a three-phase induction motor is operated with 6 poles.
Figure 1A:
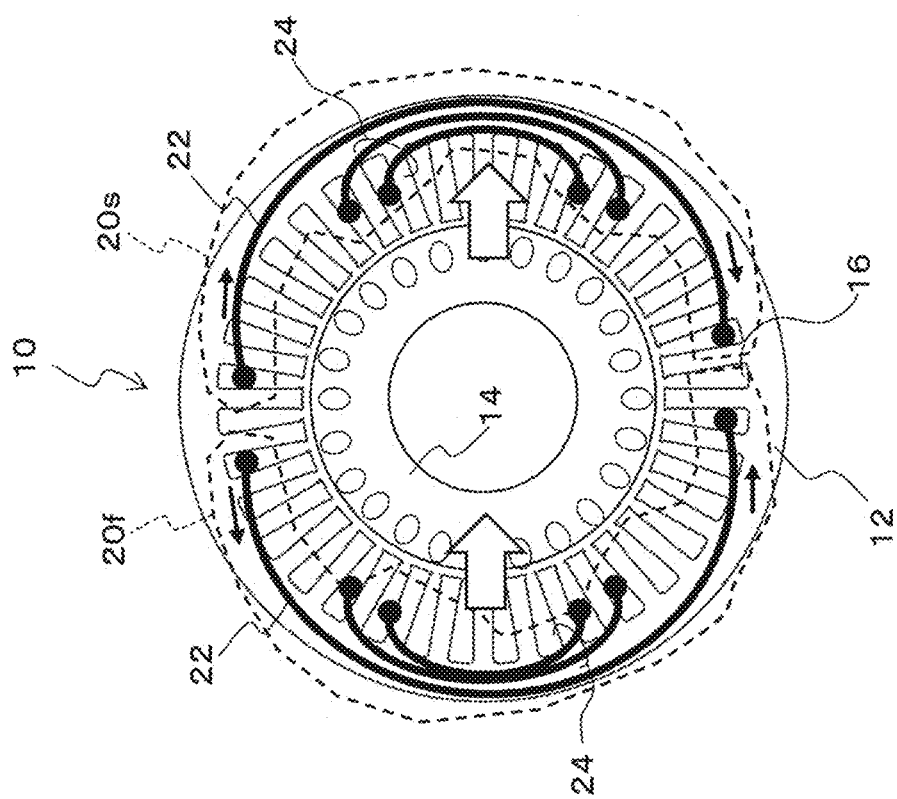
FIG. 1A is a diagram showing a direction of current and a direction of a magnetic flux when a three-phase induction motor is operated with 2 poles.
Figure 2:
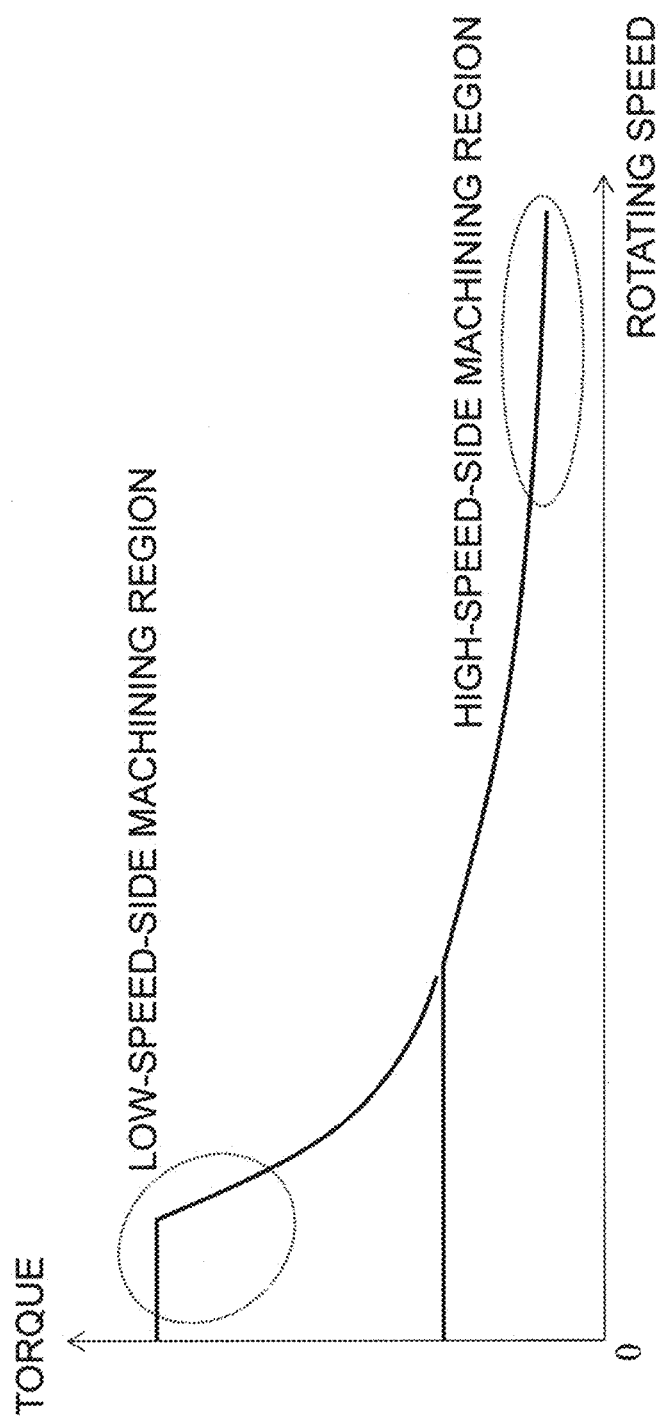
FIG. 2 is a diagram showing a rotating speed-torque characteristic of a spindle for a machine tool.

FIGS. 1A and 1B show a cross-sectional structure of a three-phase induction motor 10, a winding of one phase of the three-phase induction motor 10, and an operation principle of the three-phase induction motor 10. On a stator 12 (stator iron core), 36 slots 16 are formed, and a winding coil is housed in each slot 16. In FIGS. 1A and 1B, only the winding for one phase is shown. One phase coil has a first coil unit 20f and a second coil unit 20s. The first coil unit 20f and the second coil unit 20s are placed such that there is 180-degree electrical angle symmetry during a two-pole operation. Each of the coil units 20f and 20s includes a first coil 22 and a second coil 24. The first coil 22 is wound in a range of electrical angle symmetry of approximately 180 degrees during the two-pole operation. The number of windings of the second coil 24 is double the number of windings of the first coil 22 in a range of approximately a center third when the first coil 22 is equally divided into three parts in a circumferential direction, in such a manner that a current flows in a direction opposite to the current flowing in the first coil 22. A rotor 14 will not be described but has a typical structure with a squirrel-cage type induction winding.

FIG. 1A shows an operation during the two-pole operation, in which the electricity is applied to only the first coil 22, and as a result, a magnetic flux of two poles is generated, as shown by a thick-line arrow. FIG. 1B shows an operation during a six-pole operation, in which the electricity is applied to both the first coil 22 and the second coil 24, and a magnetic flux of six poles is generated, as shown by a thick-line arrow.

Figure 3:
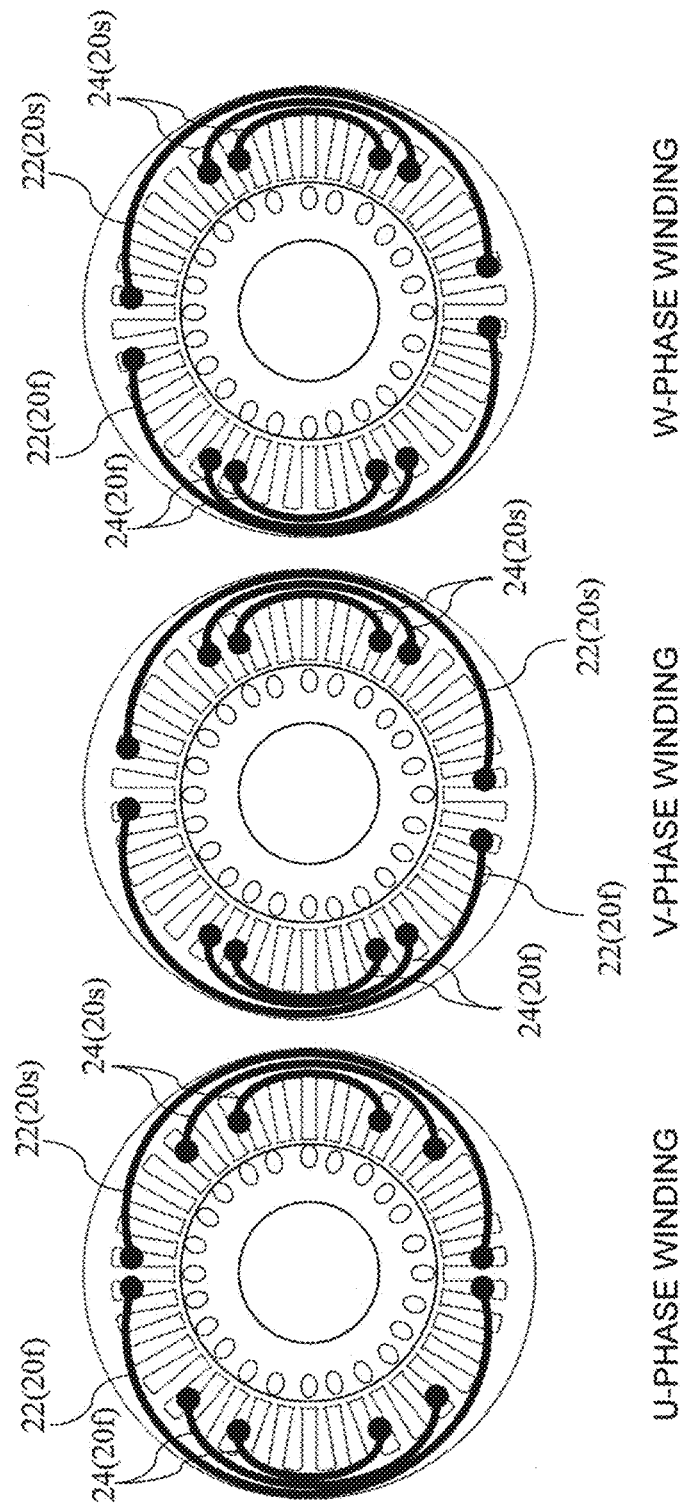
FIG. 3 is a diagram showing windings for three phases on a cross section of a three-phase induction motor.
Figure 4:
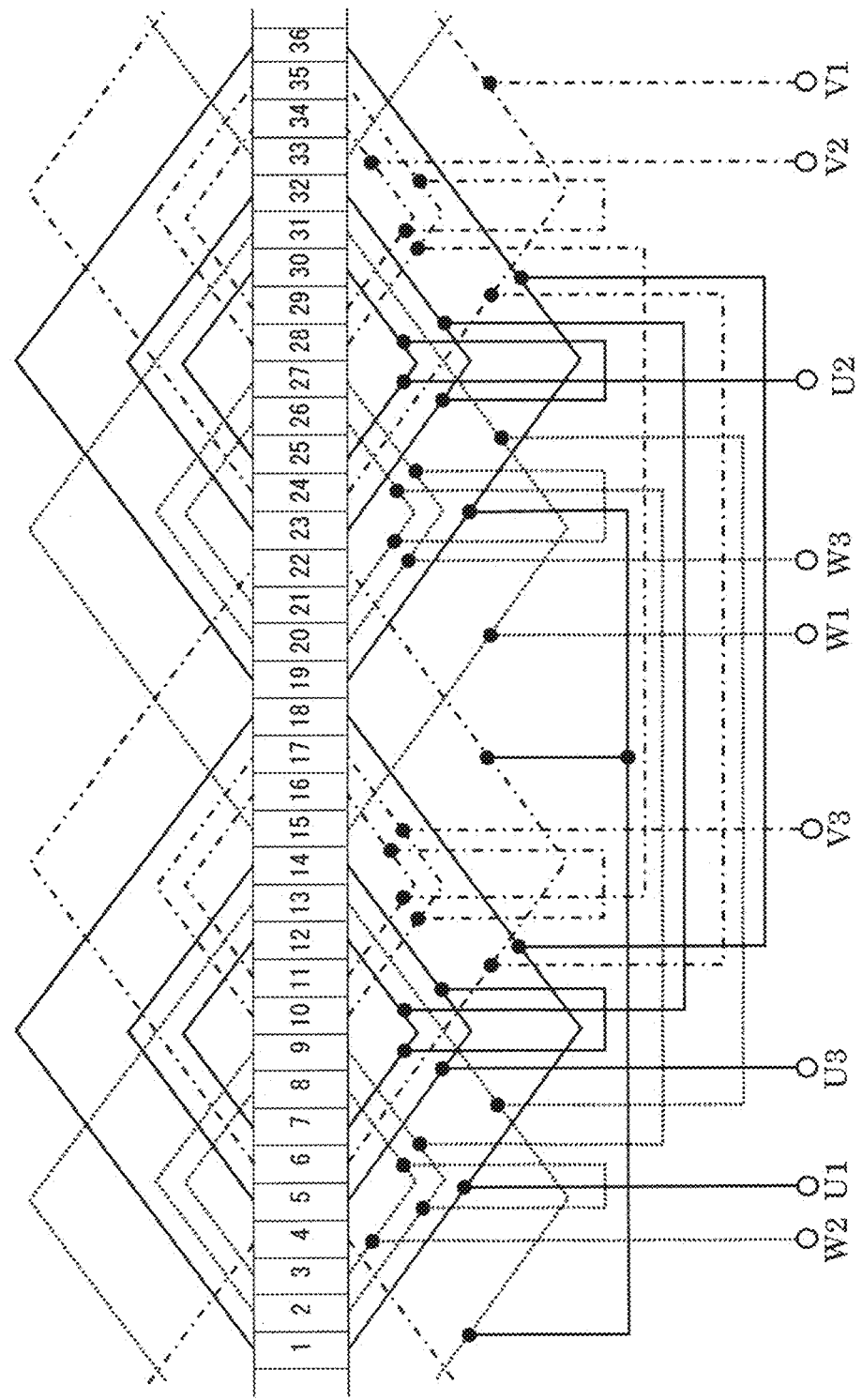
FIG. 4 is a winding diagram of a three-phase induction motor.

FIG. 3 shows placements of the three-phase windings. FIG. 4 shows a connection of the three-phase windings and positions of insertion into the slots. U1 shows a connection terminal of the first coil of a U-phase, V1 shows a connection terminal of the first coil of a V-phase, and W1 shows a connection terminal of the first coil of a W-phase. In the illustrated example configuration, for the first coil 22 of each phase, a star connection is employed, and the other end of the coil is connected to respective neutral points. While the star connection is employed in the illustrated example structure, alternatively, a delta connection may be employed by extending the other end of the coil to the outside and providing a connection terminal. U2 and U3 show connection terminals of the second coil of the U-phase, V2 and V3 show connection terminals of the second coil of the V-phase, and W2 and W3 show connection points of the second coil of the W-phase.

In the example configuration of FIG. 4, the first coil 22 of the U-phase includes a coil wound from the 1st slot to the 18th slot, and a coil wound from the 36th slot to the 19th slot. These two coils are connected in series. The second coil 24 of the U-phase includes a coil wound from the 12th slot to the 7th slot, a coil wound from the 14th slot to the 5th slot, a coil wound from the 23rd slot to the 32nd slot, and a coil wound from the 25th slot to the 30th slot. These four are connected in series.

The first coil 22 of the V-phase includes a coil wound from the 22nd slot to the 6th slot, and a coil wound from the 24th slot over the 36th slot to the 4th slot. These two coils are connected in series. The second coil 24 of the V-phase includes a coil wound from the 10th slot to the 17th slot, a coil wound from the 11th slot to the 16th slot, a coil wound from the 35th slot to the 28th slot, and a coil wound from the 34th slot to the 29th slot. These four coils are connected in series.

The first coil 22 of the W-phase includes a coil wound from the 15th slot to the 31st slot, and a coil wound from the 13th slot over the 1st slot to the 33rd slot. These two coils are connected in series. The second coil 24 of the W-phase includes a coil wound from the 2nd slot to the 9th slot, a coil wound from the 3rd slot to the 8th slot, a coil wound from the 27th slot to the 20th slot, and a coil wound from the 26th slot to the 21st slot. These four coils are connected in series.

Figure 5:
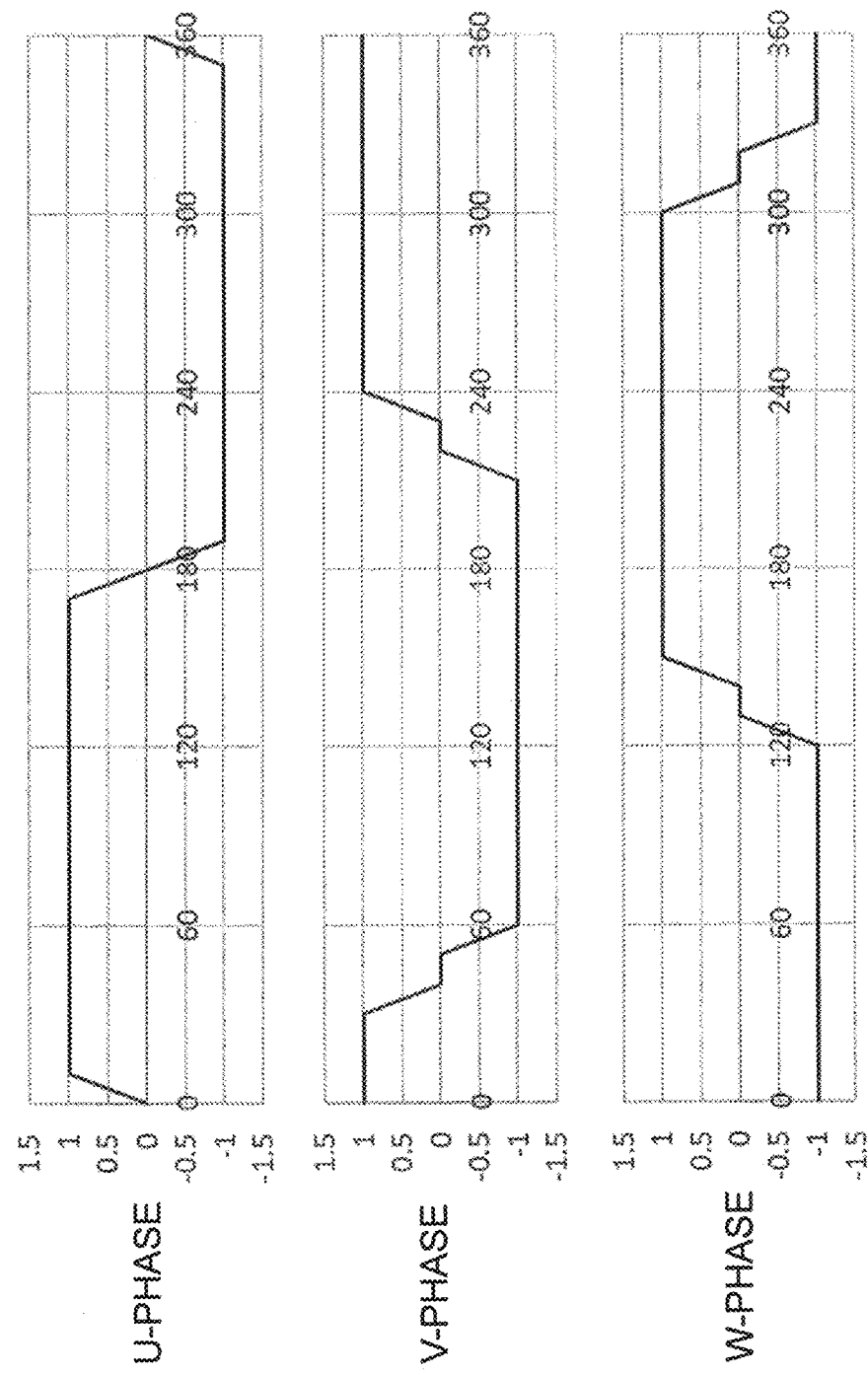
FIG. 5 is a diagram showing a distribution of magnetomotive force on an inner circumference of a stator during a two-pole operation when the winding diagram of FIG. 4 is employed.
Figure 6:
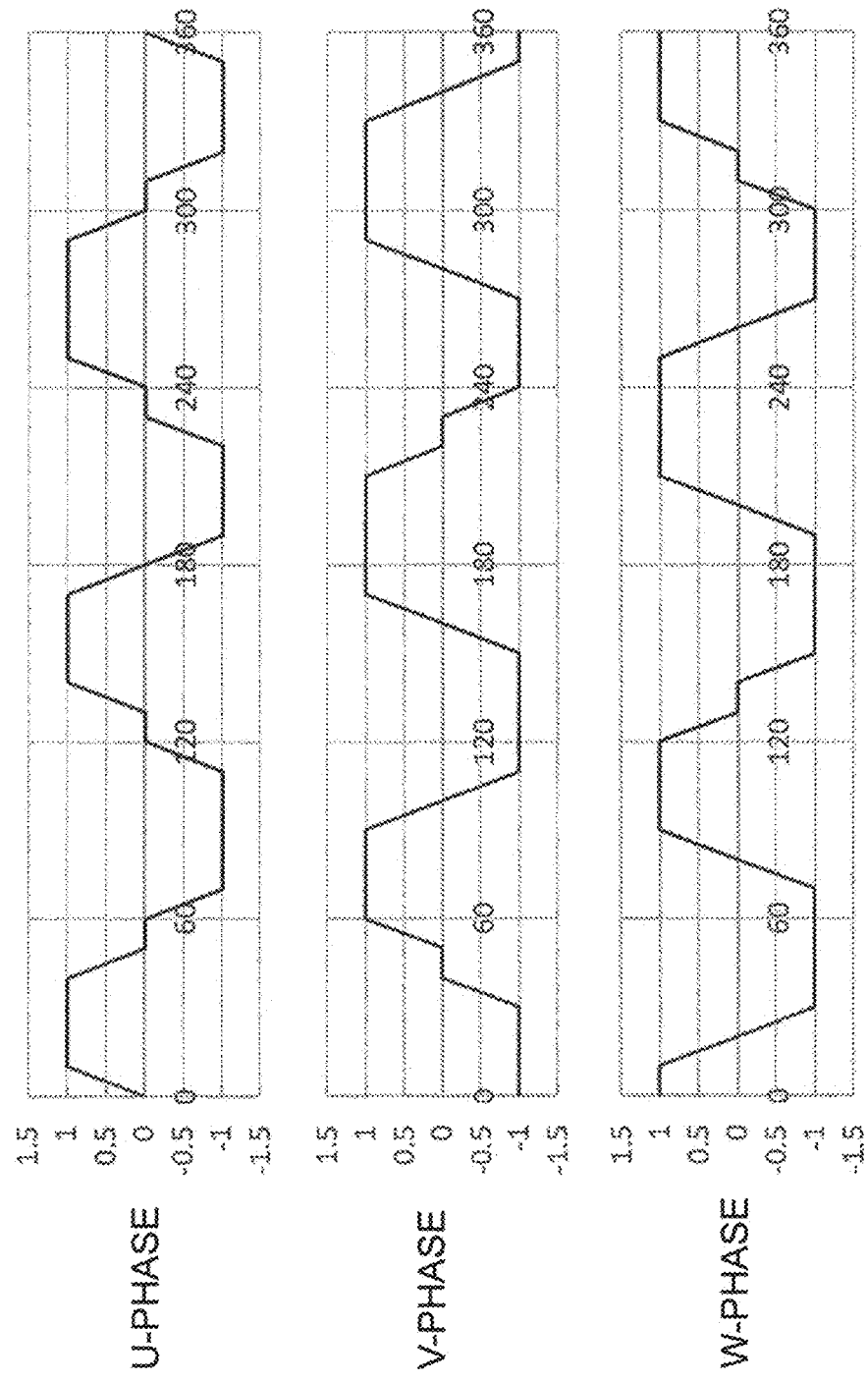
FIG. 6 is a diagram showing a distribution of magnetomotive force on an inner circumference of a stator during a six-pole operation when the winding diagram of FIG. 4 is employed.

FIG. 5 shows a distribution of magnetomotive force when the three-phase induction motor 10 employing the winding diagram of FIG. 4 is operated with two poles, showing the electrical angle on the horizontal axis and the magnetomotive force on the vertical axis. FIG. 6 shows a distribution of the magnetomotive force when the three-phase induction motor 10 employing the winding diagram of FIG. 4 is operated with six poles.

Figure 7:
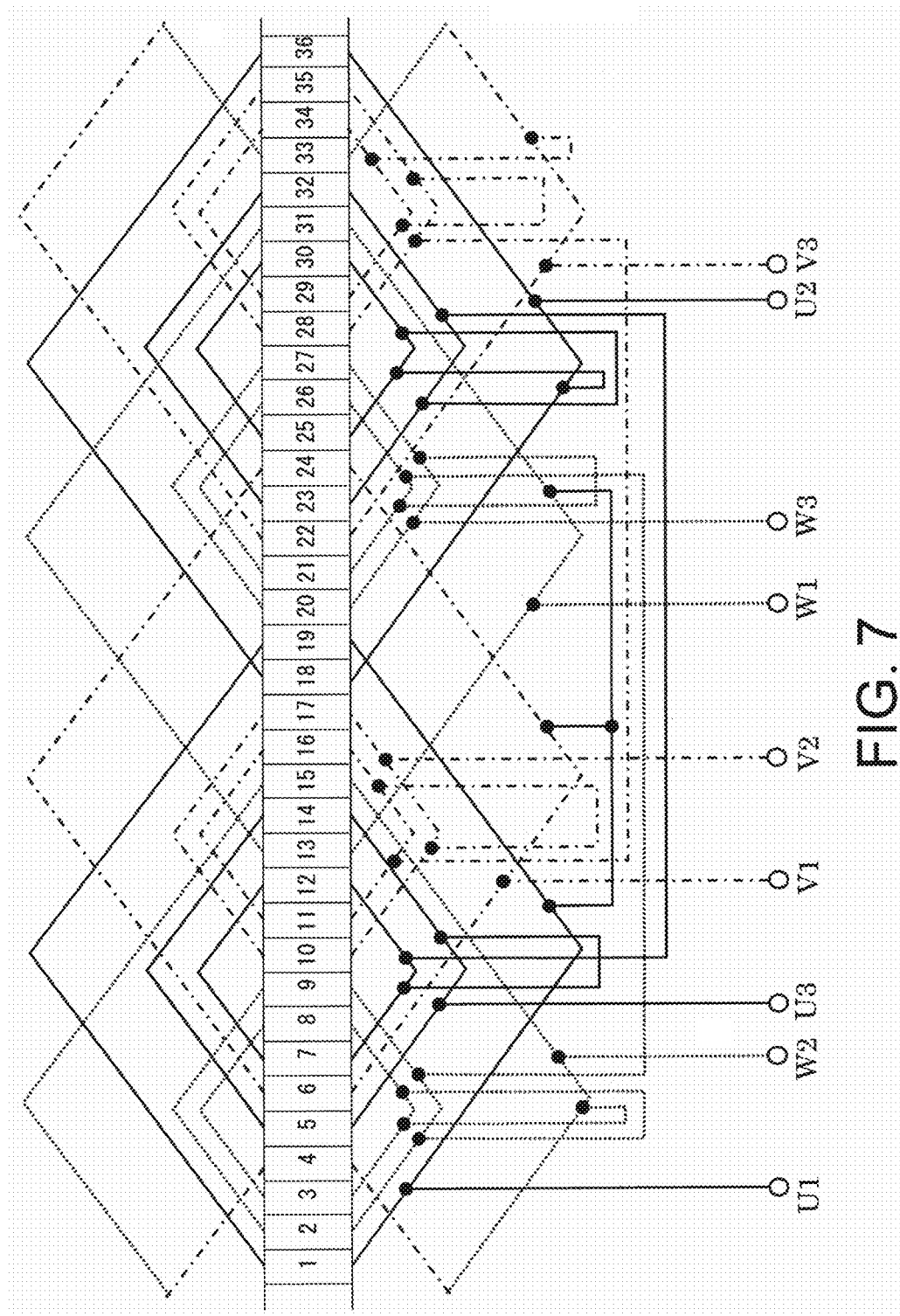
FIG. 7 is a winding diagram of a three-phase induction motor according to another embodiment of the present disclosure.

FIG. 7 is a diagram showing another example configuration of the three-phase induction motor 10. In the connection of the windings shown in FIG. 4, a phase difference of the three phases of the magnetomotive force has an error with respect to an electrical angle of 120 degrees when the three-phase induction motor 10 is used in the two-pole configuration. In consideration of this, in the three-phase induction motor 10 shown in FIG. 7, the first coil 22 of the first coil unit 20f is not connected to the first coil 22 of the second coil unit 20s and is set to be independent. More specifically, the first coil 22 of the first coil unit 20f of a U-phase has a coil wound from the 1st slot to the 19th slot. This coil is not connected to any of the other coils belonging to the same phase. The first coil 22 of the second coil unit 20s of the U-phase includes a coil wound from the 36th slot to the 18th slot. This coil is connected in series to the second coil 24 of the U-phase. The second coil 24 of the U-phase includes a coil wound from the 12th slot to the 7th slot, a coil wound from the 14th slot to the 5th slot, a coil wound from the 23rd slot to the 32nd slot, and a coil wound from the 25th slot to the 30th slot. These four coils are connected in series.

The first coil 22 of the first coil unit 20f of a V-phase has a coil wound from the 6th slot to the 24th slot. This coil is not connected to any of the other coils belonging to the same phase. The first coil 22 of the second coil unit 20s of the V-phase includes a coil wound from the 4th slot over the 1st slot to the 22nd slot. This coil is connected in series to the second coil 24 of the V-phase. The second coil 24 of the V-phase includes a coil wound from the 17th slot to the 10th slot, a coil wound from the 16th slot to the 11th slot, a coil wound from the 28th slot to the 35th slot, and a coil wound from the 29th slot to the 34th slot. These four coils are connected in series.

The first coil 22 of the first coil unit 20f of a W-phase includes a coil wound from the 13th slot to the 31st slot. This coil is not connected to any of the other coils belonging to the same phase. The first coil 22 of the second coil unit 20s of the W-phase includes a coil wound from the 15th slot to the 33rd slot. This coil is connected in series to the second coil 24 of the W-phase. The second coil 24 of the W-phase includes a coil wound from the 27th slot to the 20th slot, a coil wound from the 26th slot to the 21st slot, a coil wound from the 2nd slot to the 9th slot, and a coil wound from the 3rd slot to the 8th slot. These four coils are connected in series.

When the three-phase induction motor is used with two poles, the electricity is applied to only the first coil 22 of the first coil unit 20f. The first coil 22 of the second coil unit 20s is connected in series to the second coil 24, and the electricity is applied to the first coil 22 of the second coil unit 20s when the three-phase induction motor is used with six poles. In this case, because a number of windings when used in the two-pole configuration is halved, there is a problem in that sufficient torque cannot be output in the two-pole configuration. However, because the control stability at the high speed is demanded for the two-pole configuration, the advantages of the phase difference of the three phases being accurate is greater.

Figure 8:
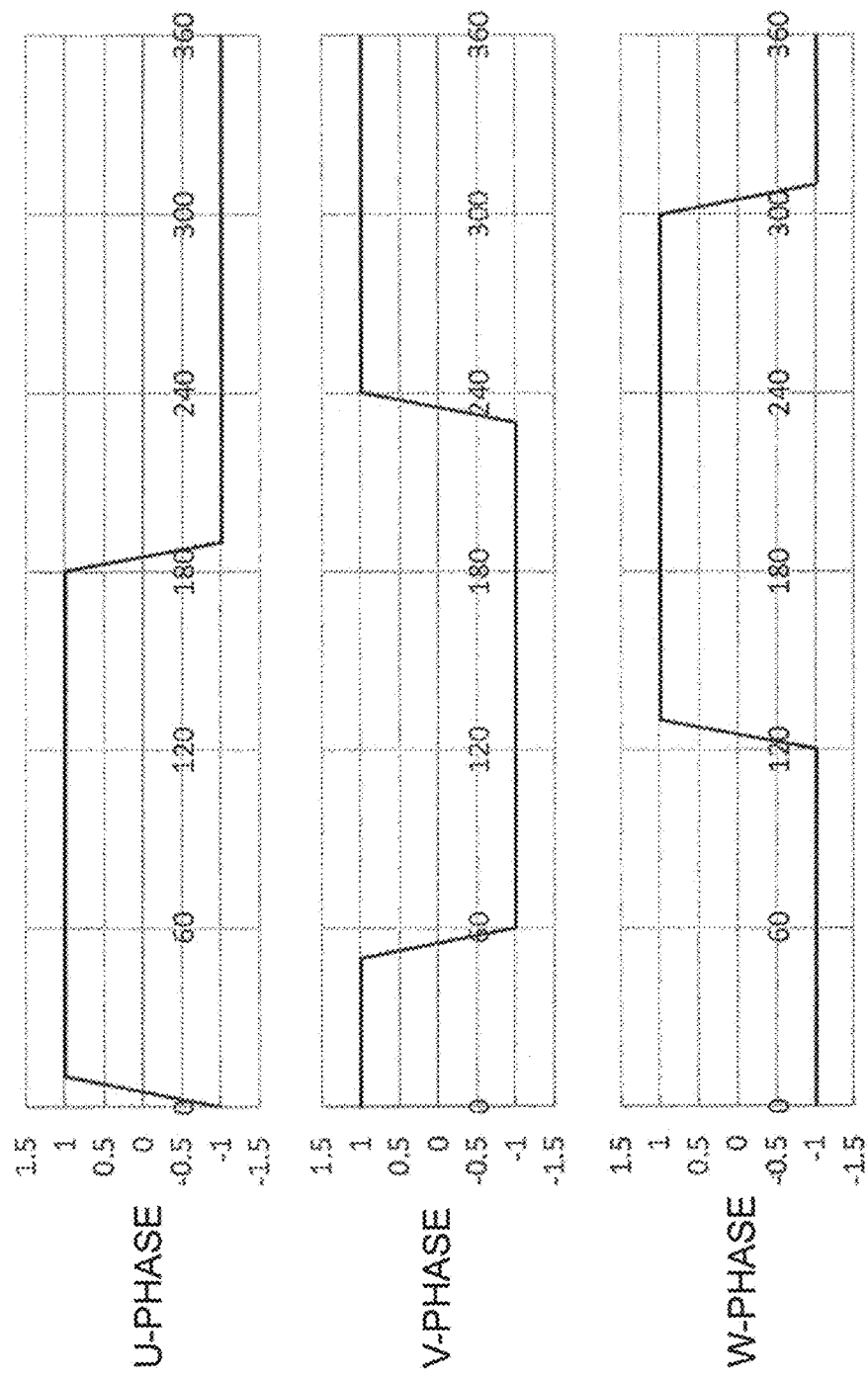
FIG. 8 is a diagram showing a distribution of magnetomotive force on an inner circumference of a stator during a two-pole operation when the winding diagram of FIG. 7 is employed.

FIG. 8 shows a distribution of the magnetomotive force when the three-phase induction motor 10 employing the winding diagram of FIG. 7 is operated with two poles. As is clear from the comparison between FIGS. 5 and 8, according to the winding diagram of FIG. 7, the phase difference of the three phases of the distribution of the magnetomotive force can be set closer to 120 degrees.

FIGS. 9A and 9B are diagrams showing a cross-sectional structure for a half turn, and a winding placement of one phase of the three-phase induction motor 10 of the other embodiment. The three-phase induction motor 10 shown in FIGS. 9A and 9B can be switched between a four-pole configuration and a twelve-pole configuration. In this case, 72 slots 16 are formed in the stator 12, and the placement of the windings of the 1st slot to the 36th slot is identical to that of the three-phase induction motor 10 shown in FIGS. 1A and 1B, which switches between the two-pole configuration and the six-pole configuration. The 37th slot to the 72nd slot (not shown) have a structure and a placement symmetric with the 1st slot to the 36th slot. The winding placements shown in FIGS. 9A and 9B show the winding for the U-phase. For the V-phase and the W-phase (not shown), the winding placements for 36 slots for the V-phase and the W-phase shown in FIG. 3 are expanded to two rounds and 72 slots. That is, in the three-phase induction motor 10 shown in FIGS. 9A and 9B, one phase coil includes two unit pairs, each formed from the first coil unit 20f and the second coil unit 20s.

The description given above is merely an example, and alternatively, each phase coil may include three or more unit pairs, each formed from the first coil unit 20f and the second coil unit 20s. In addition, in the above, no particular limitation is imposed on the number of windings in one coil unit, so long as the number of windings of the second coil 24 is twice the number of windings of the first coil 22.

The invention claimed is:
1. A three-phase induction motor in which coils of three phases are wound around a plurality of slots formed on an inner circumference of a stator iron core, wherein
   each of the coils of three phases includes one or more unit pairs, each formed from a first coil unit and a second coil unit,
   the first coil unit and the second coil unit are placed with an electrical angle symmetry of 180 degrees during a (2×n)-pole operation,
   each coil unit has a first coil and a second coil,
   the first coil is formed by winding a winding m times in an electrical angle range of 180 degrees during the (2×n)-pole operation,
   the second coil is formed by winding the winding (2×m) times in a range of a center third when the first coil is equally divided into three parts in a circumferential direction, in such a manner that a current flows in a direction opposite to a direction of current flowing in the first coil,
   the three-phase induction motor operates with (6×n) poles by applying electricity to both the first coil and the second coil, and the three-phase induction motor operates with (2×n) poles by applying the electricity to only the first coil, and
   each of the m and the n is a natural number.

2. The three-phase induction motor according to claim 1, wherein
   the first coil of the first coil unit and the first coil of the second coil unit are connected in series,
   the second coil of the first coil unit and the second coil of the second coil unit are connected in series, and
   there is no connection between the first coil and the second coil.

3. The three-phase induction motor according to claim 2, wherein
   the stator iron core has 36 slots,
   the first coil of a U-phase includes a coil wound from a 1st slot to an 18th slot, and a coil wound from a 36th slot to a 19th slot,
   the first coil of a V-phase includes a coil wound from a 22nd slot to a 6th slot, and a coil wound from a 24th slot over the 36th slot to a 4th slot,
   the first coil of a W-phase includes a coil wound from a 15th slot to a 31st slot, and a coil wound from a 13th slot over the 1st slot to a 33rd slot,
   the second coil of the U-phase includes a coil wound from a 12th slot to a 7th slot, a coil wound from a 14th slot to a 5th slot, a coil wound from a 23rd slot to a 32nd slot, and a coil wound from a 25th slot to a 30th slot,
   the second coil of the V-phase includes a coil wound from a 10th slot to a 17th slot, a coil wound from an 11th slot to a 16th slot, a coil wound from a 35th slot to a 28th slot, and a coil wound from a 34th slot to a 29th slot, and
   the second phase of the W-phase includes a coil wound from a 2nd slot to a 9th slot, a coil wound from a 3rd slot to an 8th slot, a coil wound from a 27th slot to a 20th slot, and a coil wound from a 26th slot to a 21st slot.

4. A three-phase induction motor in which coils of three phases are wound around a plurality of slots formed on an inner circumference of a stator iron core, wherein
   each of the coils of three phases includes one or more unit pairs, each formed from a first coil unit and a second coil unit,
   the first coil unit and the second coil unit are placed with an electrical angle symmetry of 180 degrees during a (2×n)-pole operation,
   each coil unit has a first coil and a second coil,
   the first coil is formed by winding a winding m times in an electrical angle range of 180 degrees during the (2×n)-pole operation,
   the second coil is formed by winding the winding (2×m) times in a range of a center third when the first coil is equally divided into three parts in a circumferential direction, in such a manner that a current flows in a direction opposite to a direction of current flowing in the first coil, the three-phase induction motor operates with (6×n) poles by applying electricity to both the first coil and the second coil of all of the coil units, and the three-phase induction motor operates with (2×n) poles by applying the electricity to only the first coil of the first coil unit, and each of the m and the n is a natural number.

5. The three-phase induction motor according to claim 4, wherein there is no connection between the first coil of the first coil unit and the second coil or between the first coil of the first coil unit and the first coil of the second coil unit, and the second coil of the first coil unit, the second coil of the second coil unit, and the first coil of the second coil unit are connected to each other.

6. The three-phase induction motor according to claim 5, wherein the stator iron core has 36 slots, the first coil of a U-phase includes a coil wound from a 1st slot to a 19th slot, and a coil wound from a 36th slot to an 18th slot, the first coil of a V-phase includes a coil wound from a 6th slot to a 24th slot, and a coil wound from a 4th slot over the 1st slot to a 22nd slot, the first coil of a W-phase includes a coil wound from a 13th slot to a 31st slot, and a coil wound from a 15th slot to a 33rd slot, the second coil of the U-phase includes a coil wound from a 12th slot to a 7th slot, a coil wound from a 14th slot to a 5th slot, a coil wound from a 23rd slot to a 32nd slot, and a coil wound from a 25th slot to a 30th slot, the second coil of the V-phase includes a coil wound from a 17th slot to a 10th slot, a coil wound from a 16th slot to an 11th slot, a coil wound from a 28th slot to a 35th slot, and a coil wound from a 29th slot to a 34th slot, and the second phase of the W-phase includes a coil wound from a 27th slot to a 20th slot, a coil wound from a 26th slot to a 21st slot, a coil wound from a 2nd slot to a 9th slot, and a coil wound from a 3rd slot to an 8th slot.

* * * * *